United States Patent [19]

Mammone

[11] Patent Number: 5,796,859
[45] Date of Patent: Aug. 18, 1998

[54] PROCESSING OF KERATOSCOPIC IMAGES EMPLOYING LOCAL SPATIAL PHASE

[75] Inventor: Richard J. Mammone, Bridgewater, N.J.

[73] Assignee: Computed Anatomy Incorporated, New York, N.Y.

[21] Appl. No.: 459,531

[22] Filed: Jun. 2, 1995

Related U.S. Application Data

[63] Continuation-in-part of Ser. No. 287,126, Aug. 8, 1994, abandoned, which is a continuation-in-part of Ser. No. 44,104, Apr. 8, 1994, which is a continuation of Ser. No. 773,679, Oct. 8, 1991, abandoned.

[51] Int. Cl.$^6$ .................... G06K 9/00; A61B 3/10
[52] U.S. Cl. .................... 382/128; 351/212; 351/221
[58] Field of Search .................... 382/128, 154, 382/285, 280; 351/212, 210, 206, 221, 245–247; 356/376

[56] References Cited

U.S. PATENT DOCUMENTS

| | | | |
|---|---|---|---|
| 3,598,478 | 8/1971 | Townley | 351/206 |
| 3,797,921 | 3/1974 | Kilmer et al. | 351/212 |
| 4,685,140 | 8/1987 | Mount, II | 382/128 |
| 4,772,115 | 9/1988 | Gersten et al. | 351/212 |
| 4,794,550 | 12/1988 | Greivenkamp | 356/357 |
| 4,805,129 | 2/1989 | David | 382/260 |
| 4,863,260 | 9/1989 | Gersten et al. | 351/212 |
| 4,978,213 | 12/1990 | El Hage et al. | 351/212 |
| 4,995,716 | 2/1991 | Warnicki et al. | 351/212 |
| 5,054,907 | 10/1991 | Sklar et al. | 351/212 |
| 5,110,200 | 5/1992 | Snook | 351/212 |
| 5,300,965 | 4/1994 | Kitajima | 351/212 |
| 5,550,697 | 8/1996 | Fujieda | 351/212 |

FOREIGN PATENT DOCUMENTS

WO 92/01417  2/1992  WIPO.

OTHER PUBLICATIONS

Takeda, et al. "Fourier Transform Profilometry for the Automatic Measurement of 3–D Object Shape", Applied Optics 22:3977–82, Dec. 15, 1983.

Suganuma, et al. "Three Dimensional Shape Analysis by Use of a Projected Grated Image", Optical Engineerign, 30:1529–33, Oct. 1991.

Greivenkamp, et al. "Measurement of Toric Reference Surfaces with the Computed Anatomy TMS–1", Ophth & Vis. Optom., Soc. Amer., 1993 Tech Dig. Series, 3:54.

Mammone, et al. "3–D Corneal Modeling System", IEEE Transactions on Biomedical Eng., 37:66–90, Jan. 1990.

*Primary Examiner*—Leo H. Boudreau
*Assistant Examiner*—Bhavesh Mehta
*Attorney, Agent, or Firm*—Howard R. Popper

[57] ABSTRACT

Quantitative measurement of corneal surface topography is obtained by processing a two-dimensional image of the surface which reflects a quasi-periodic illuminated pattern, such as series of concentric rings, from a Placido disk source. The local spatial phases exhibited by the image of the illuminated pattern when reflected from the corneal surface and when reflected from standard specular surfaces are obtained by processing the images which includes use of specially filtered Fourier and inverse transforms. The distances at which predetermined local spatial phases are observed in the image from the cornea are compared with the distances at which these same phases are observed in the images of the standard surfaces. The distances are also compared with certain corresponding distances on the Placido disk source and converted to reveal the dioptric powers of refraction of the corneal surface without the need for parametric interpolation. Results are obtained to a finer degree of granularity than the number of rings in the pattern or even the actual number of pixels in the pattern. During the processing, any mislocation of the apex of the corneal surface along the optical axis is compensated for.

24 Claims, 10 Drawing Sheets

PROCESSING OF KERATOSCOPIC IMAGES EMPLOYING LOCAL SPATIAL PHASE

This application is a continuation-in-part of application Ser. No. 08/287,126 filed Aug. 8, 1994, now abandoned, which is a continuation-in-part of application Ser. No. 08/044,104, filed Apr. 8, 1994, which is a continuation of application Ser. No. 07/773,679 filed Oct. 8, 1991, now abandoned.

TECHNICAL FIELD

This invention relates to instruments for measuring surface topography, and more particularly, to such instruments known as keratoscopes.

BACKGROUND OF THE INVENTION

In my co-pending application Ser. No. 08/044,104, filed Apr. 8, 1993 as a continuation of Ser. No. 07/773,679 originally filed Oct. 8, 1991, the disclosure of which is hereby incorporated by reference, I disclosed a method of ascertaining the topography of a surface illuminated with a quasi-periodic light pattern of concentric, illuminated rings, by taking specially filtered Fourier and inverse Fourier transforms of the two-dimensional image of the surface. The results were calibrated by observing the frequencies exhibited by a plurality of surfaces having known diopters of refraction. The spatial frequencies were tabulated in a matrix and the coefficients of a polynomial were obtained to relate the observed spatial frequencies to the known dioptric powers of the different surfaces by using a least-squares method of curve fitting. The polynomial could then be used to find the diopters of refraction exhibited by a similarly illuminated unknown surface from the local spatial frequencies found in its similarly processed image. This method provided more measurements over the surface than the number of illuminated rings in the image and also eliminated the need to find the edges of each of the rings in the illuminated pattern as was required in the prior art Gersten et al patent 4,863,260 issued Sep. 5, 1989.

In the processing method of my aforementioned co-pending application, the data that was mapped to diopters was the spatial frequency observed at discrete pixels of the processed image. Though this data was of a finer degree of granularity than the number of rings in the image, the relationship between the values observed at the regularly-spaced pixel positions and the corresponding dioptric values is not straight-forward when the surface to be analyzed is specular. This occurs because the specular surface exhibits a local variation in magnification that depends nonlinearly on distance from the optical axis. Accordingly, for the specular surface, the least-squares method of mapping the spatial frequency values obtaining at fixed pixel positions could provide only an approximation of the exact relationship.

It may also be recalled, as disclosed in the aforementioned '260 patent, that accurate location of the apex of the cornea was important to the success of the topographic analysis and, to that end, intersecting laser light beams were employed to accurately locate the apex of the cornea. These light beams, however, were rather bright and could give rise to extraneous glare in the image. Therefore, to prevent the glare from swamping useful data in the image, the locating laser light beams were shut off just before the image to be analyzed was acquired. This required that the patient's head be maintained motionless between the time the locating light beams are turned off and the time that the image is acquired for processing. Accordingly, it would be desirable to more directly and accurately to ascertain the powers of refraction exhibited over a corneal surface and to allow the image to be processed without requiring the locating light beams to be turned off. In addition, it would be advantageous to allow the processing to compensate for any inadvertent mislocation of the corneal surface.

SUMMARY OF THE INVENTION

In accordance with my invention, the topography of a three-dimensional specular surface, such as a cornea, may accurately be measured by processing a two-dimensional image of the surface illuminated with a quasi-periodic pattern, such as a pattern of concentric illuminated rings provided by an illuminated object such as a Placido disc cone device described in U.S. Pat. No. 4,863,260, issued Sep. 5, 1989. The two-dimensional image is processed to obtain continuous values of local spatial phase with respect to distance perpendicular to the optical axis rather than with respect to pixel position.

More particularly, a Fourier transform is taken of the two-dimensional image, the Fourier spectrum is windowed and band-pass filtered to suppress all side lobes and negative frequencies except for the fundamental spatial frequency. The inverse transform is taken and then the inverse tangent of the quotient of the imaginary and real portions of the inverse transform are computed to obtain the local spatial phase. The local spatial phase is "unwrapped" to obtain continuous values of local spatial phase with distance from the optical axis of the image. The distances from the optical axis at which predetermined values of the local spatial phase occur correspond to the positions of the illuminated rings of the pattern. The distances obtained from processing images of surfaces whose dioptric powers are known are compared and tabulated with corresponding distances in the original illuminated object to determine the local magnification produced by each surface. Images of surfaces having unknown dioptric powers may then be mapped to diopters by consulting the tabulation. Accuracy beyond that determined by the granularity of pixel position is obtained.

In accordance with a further aspect of my invention, the accuracy of topographic analysis is enhanced by allowing the locating light beams to remain on while the image is being acquired and by eliminating the effect of the glare during image processing. Mislocation of the apex of the surface in the x, y, or z direction is detected by determining the location of the light beams in the image and any such mislocation, such as may arise from inadvertent movement of the subject is compensate for.

DESCRIPTION OF THE DRAWING

The foregoing and other objects of my invention may be better understood from the following specification and drawing, in which:

FIG. 1 is a sectional view showing a quasi-spherical specular surface properly positioned in the conical Placido disc apparatus of prior art patent 4,863,260, while

FIG. 2A shows one of the rings reflected in the image of the quasi-spherical surface, while FIG. 2B shows exaggerated glare spots in the image;

FIG. 5 consisting of FIGS. 5A and 5B are flow charts for procedures involved in processing the image of a specular surface to remove the effects of glare and improper positioning of the surface;

GENERAL DESCRIPTION

Figure 1:
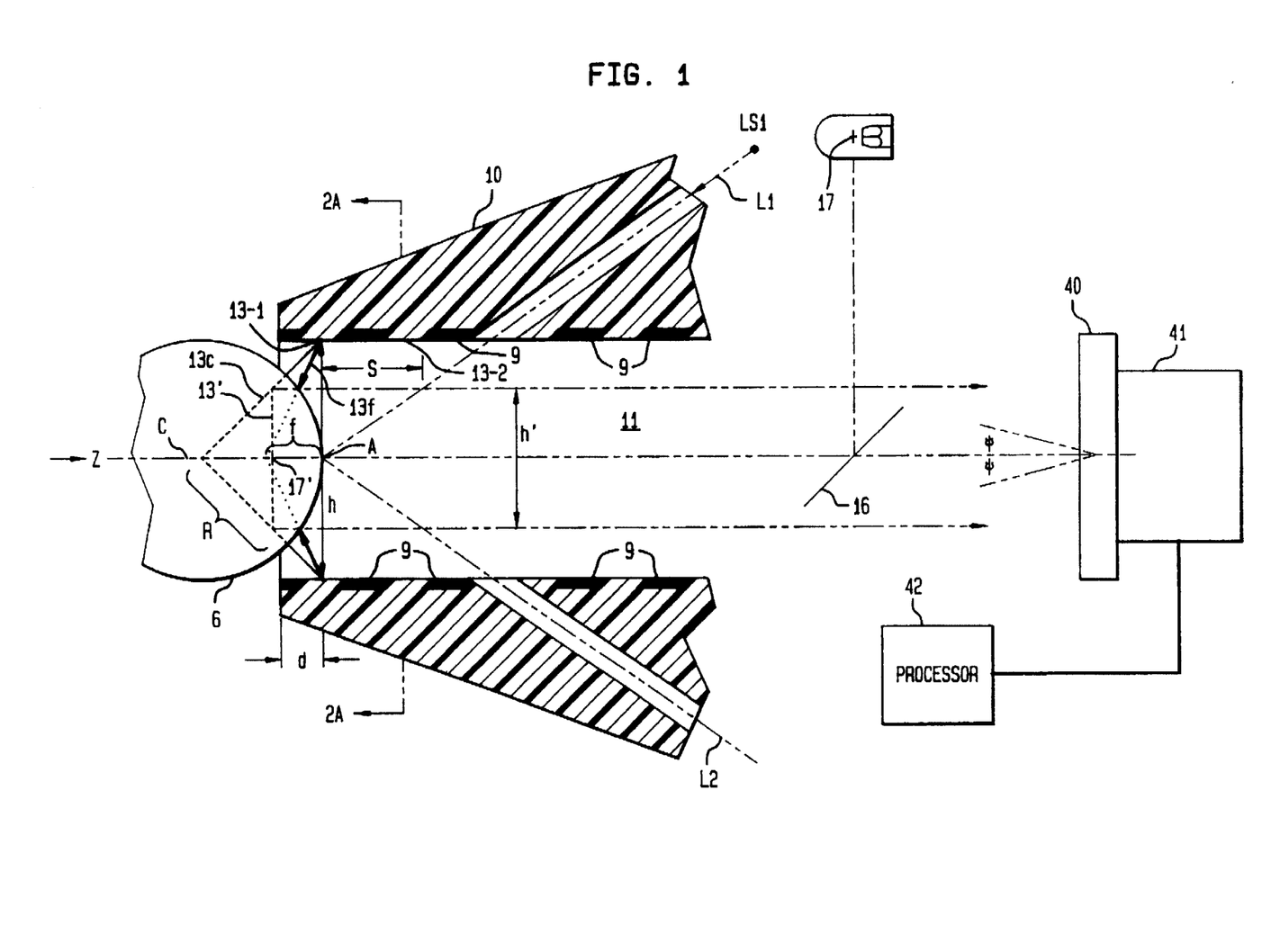

Referring now to FIG. 1, there is shown a section through the prior art illuminated Placido disc cone device 10 described in U.S. Pat. No. 4,863,260, issued Sep. 5, 1989. Cone 10 causes a quasi-periodic mire pattern to be reflected from a quasi-spherical specular surface 6, such as a human cornea or polished steel ball, positioned at its left-hand side. Cone 10 has a hollow, substantially cylindrical bore 11. A light source (not shown) is positioned at the right-hand side base of cone 10. A series of opaque bands 9 divides the otherwise transparent bore 11 into a series of illuminated rings 13, of which only rings 13-1 and 13-2, spaced the distance S apart, are individually labelled in FIG. 1. In the illustrated embodiment, each of rings 13 is of the same diameter h.

Figures 2A, 2B:
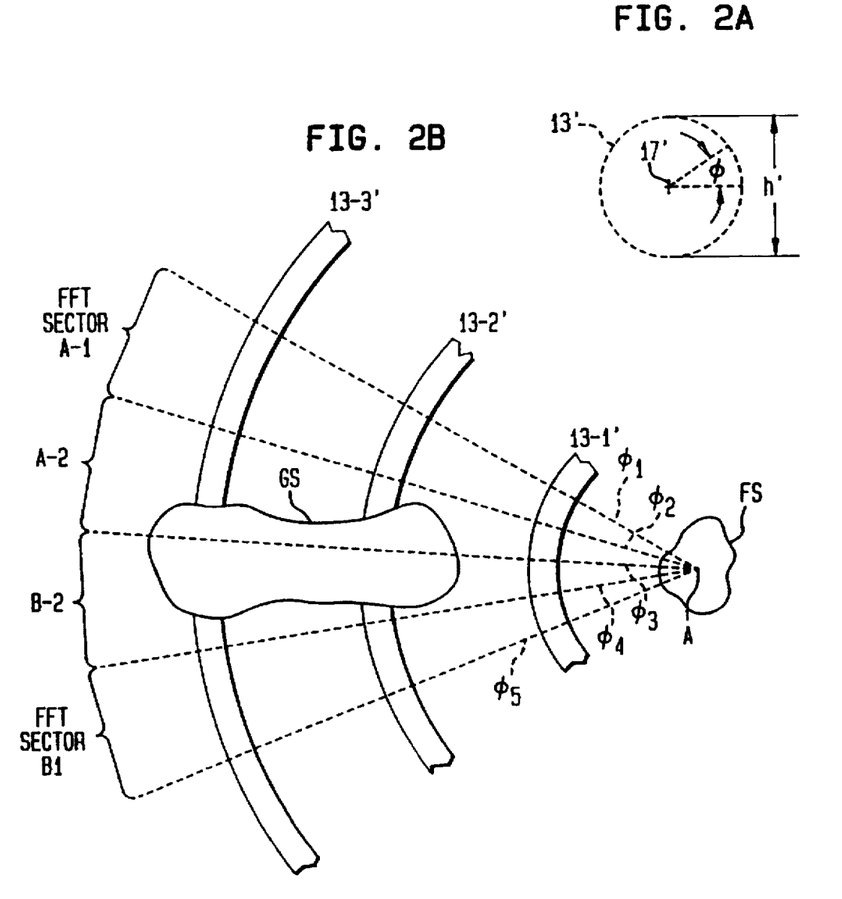

The specular surface 6 reflects a virtual image of the illuminated rings 13. On a perfectly spherical specular surface, each ring would be reflected, as shown in FIG. 2A, as a circle 13'. In FIG. 2B, greatly enlarged sectors of three illustrative virtual image rings, 13-1', 13-2' and 13-3', are shown. For simplicity, however, FIG. 1 shows an edge view of only one of these virtual image rings, 13'. Ring 13' appears to lie at some distance beneath the specular surface 6.

As explained, inter alia, in the article "Keratometery" by Janet Stone in the book *Contact Lens Practice*, a ray incident upon a spherical mirror aimed at the focus, f, will be reflected parallel to the optical axis and will produce a virtual image which appears to lie beneath the surface of the sphere while a ray directed perpendicular to the surface toward the surface's center of curvature will be directed back upon itself. To locate a point on the plane of the virtual image, the reflected ray should be projected parallel to the optical axis until it intersects the ray directed to the center of the sphere. This is illustrated in FIG. 1 with respect to two rays 13f and 13c from illuminated object ring 13-1 of cone 10. Ray 13c is directed to the center of curvature, C, of spherical surface 6 while ray 13f is directed to the focus, (which lies a distance f beneath the surface). The plane of the virtual image 13' of object ring 13-1 is located by projecting reflected ray 13f parallel to the optical axis until it strikes the projection of ray 13c. The virtual image ring 13' is defined by the intersection of light ray 13c, which is directed perpendicular to the specular surface 6, i.e., toward its center of curvature, C, and the backward extension of ray 13f, which passes through the focus of specular surface 6, parallel to optical axis A-C.

Figure 1A:
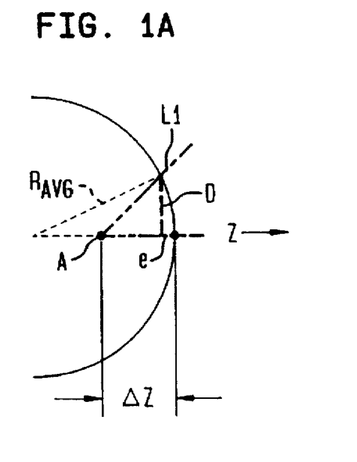
FIGS. 1A and 1B show the surface too closely and too remotely positioned, respectively.
Figure 1B:
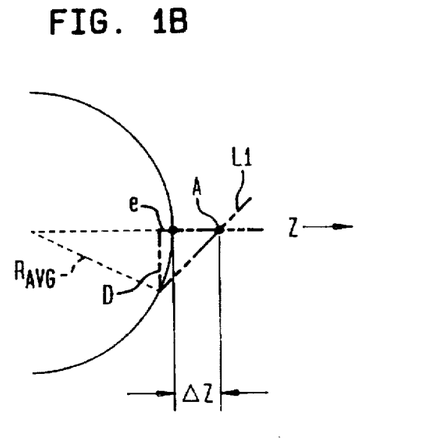
Figure 7:
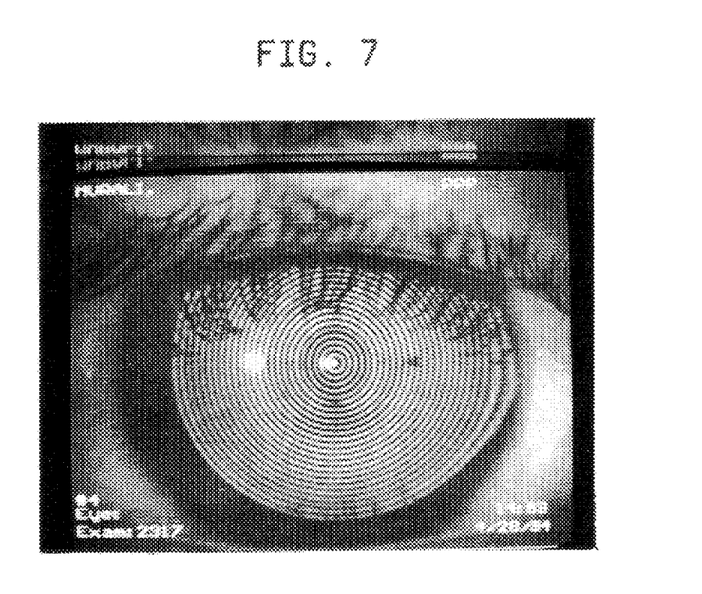
FIGS. 7 and 8 are photographs of a human cornea shown before and after processing to remove the effects of glare.
Figure 8:
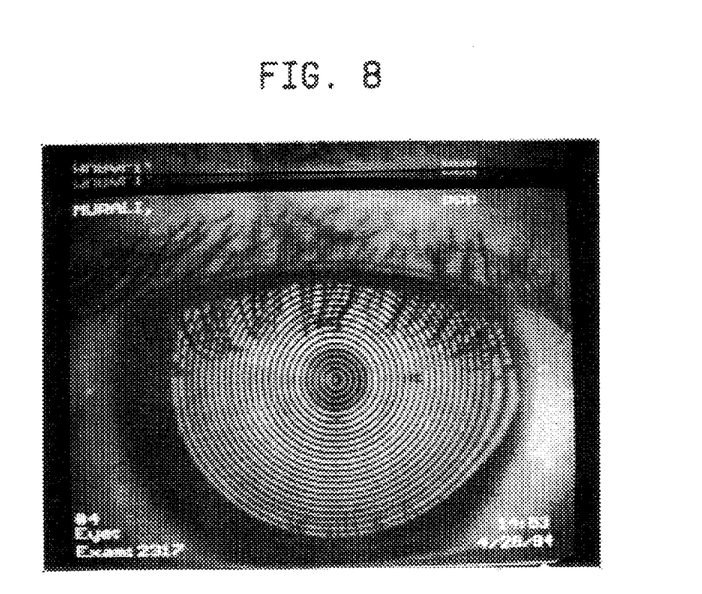

As explained in the aforementioned '260 patent, the proper positioning of specular surface 6 is indicated when intersecting light beams L1 and L2 (advantageously laser beams) converge at single point A at the apex of the specular surface 6. When surface 6 is properly positioned so that point A is on the optical (Z) axis which runs through the center of bore 11 of cone 10, point A will lie in the center of the field of camera 41 and the distance __ between point A and the camera 41 is accurately known. In addition, when surface 6 is properly positioned, the reflection 17' of fixation light 17 from pellicle 16 will also appear at point A. If, however, surface 6 is positioned too far into bore 11 (FIG. 1A), or too far out of bore 11 (FIG. 1B), light beam L1 will not strike surface 6 at point A but at some distance D above or below point A, thereby introducing an axial error $\Delta Z$ in the location of point A. The point where the light beam L1 strikes surface 6 effects a local glare spot GS, as shown in the greatly enlarged view FIG. 2B, which shows glare spot GS obscuring a portion of one or more rings such as 13-2' and 13-3'. A photograph of an eye where glare spots obscure some of the reflected rings is shown in FIG. 7. As will hereinafter be explained, the mislocation of glare spot GS from point A, as well as its ring obscuring effect are compensated for by my improved image processing method, the results of which are shown in FIG. 8.

As disclosed in my above-mentioned application, the image of surface 6 is acquired by electronic camera 41, through lens 40. Processor 42 scans the image acquired by camera 41 in a direction orthogonal to the illuminated pattern that is reflected from surface 6, e.g., an illuminated ring pattern is scanned radially. However, if bore 11 of cone 10 were provided with illuminated longitudinal stripes (not shown) parallel to the axis of the cylindrical bore 11, such longitudinal stripes would cause a pattern of radial lines to be reflected from quasi-spherical surface 6 and orthogonal scanning of such radial lines would be in a circular direction.

Figure 3A:
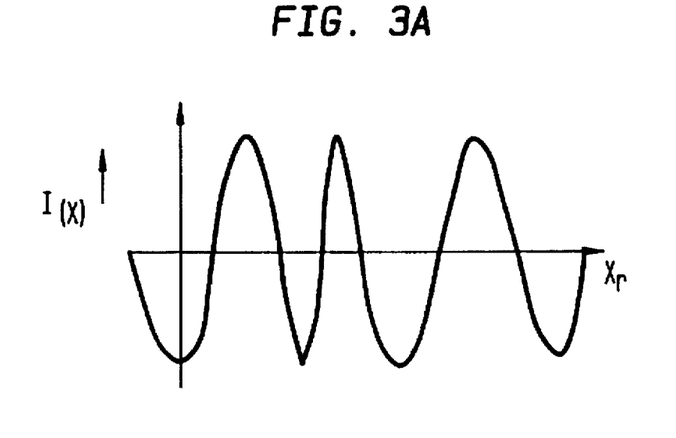
FIG. 3A is a plot of the intensity of surface illumination versus radial distance for a quasi-periodic pattern reflected from the specular surface.

FIG. 3A shows the waveform of video intensity versus orthogonal scanning distance in the image acquired by processor 42. The average frequency of the waveform is determined by the average spacing (see, for example, illustrative spacing "S", FIG. 1) of the illuminated rings of the Placido disc source of the light pattern. On a surface having surface imperfections, the instantaneous spatial frequency of the pattern will vary as surface imperfections distort the local light pattern.

My co-pending application taught that the since the illuminated spatial pattern is quasi-periodic it can be decomposed into its Fourier series:

$$f_P(x) = \sum_{i=0}^{\infty} a_i \cos(i\omega_0 x) + b_i \sin(i\omega_0 x) \quad (1)$$

In the above expression, $b_i=0$ if the pattern is symmetrical about the origin.

As disclosed in the aforementioned co-pending application, the frequency spectrum of the video image scanned orthogonally to the quasi-periodic pattern (i.e., in the direction $x_r$), may be ascertained by taking a discrete Fourier transform of the scanned image, using an analytic filter to suppress all side lobes and negative spatial frequencies in the Fourier spectrum except for the narrow band of frequencies adjoining the fundamental spatial frequency, taking the inverse transform and finding the inverse tangent of the quotient of the imaginary and real portions of the inverse transform to obtain the instantaneous spatial phase. The Fourier spectrum of the two-dimensional image is shown in FIG. 3D. The Fourier spectrum of the image after processing to suppress all side lobes and negative frequencies is shown in FIG. 3E. The real component, R(x), of the inverse transform has the form:

$$R(x) = A(x) \cos(\omega_0 x + \theta(x)) \quad (2)$$

while the imaginary component, I(x), has the form:

$$I(x)=A(x) \sin(\omega_0 x+\theta(x)) \quad (3)$$

The inverse tangent of the quotient of the imaginary component divided by the real component yields the instantaneous spatial phase $\phi$ as a function of the radial scanning distance, $x_r$:

$$\phi(x) = \tan^{-1}\left(\frac{I(x_r)}{R(x)}\right) \quad (4)$$

Figure 3B:
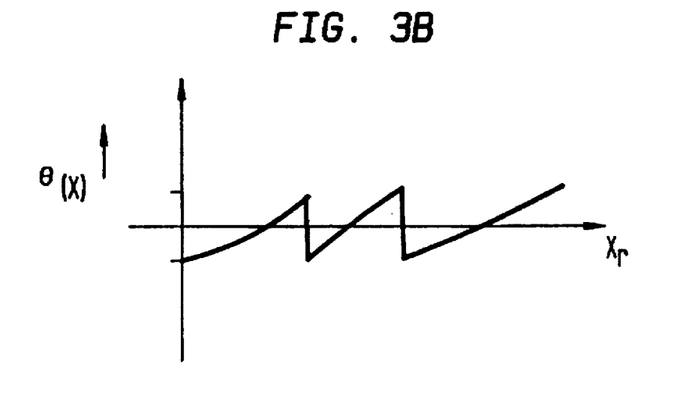
FIGS. 3B and 3C show the corresponding wrapped and unwrapped local spatial phase of the processed image.

The instantaneous phase is a saw-tooth or ramp-like function, shown in FIG. 3B, having discontinuities every $2\pi$ radians. The derivative of the instantaneous phase waveform is the instantaneous frequency (which also has discontinuities every $2\pi$ radians):

$$\frac{d}{dx}\tan^{-1}\left(\frac{I(x)}{R(x)}\right) = \omega_0 + \theta'(x) \quad (5)$$

The discontinuities may be eliminated by a process known as "phase unwrapping" which employs threshholding and numerical interpolation, as described, for example, in the article by Mitsuo Takeda, Hideki Ina and Soiji Kobayashi entitled "Fourier-transform method of fringe-pattern analysis for computer-based topography and interferometry", published in J. Opt Soc. Am, vol. 72, no. 1, January 1982 at pp. 156–160, see also, the article by Jose M. Tribolet, entitled "A New Phase Unwrapping Algorithm", published in the IEEE Transactions on Acoustics, Speech, and Signal Processing, vol ASSP-25, No. 2, April 1977, pp.170–177.

Figure 4:
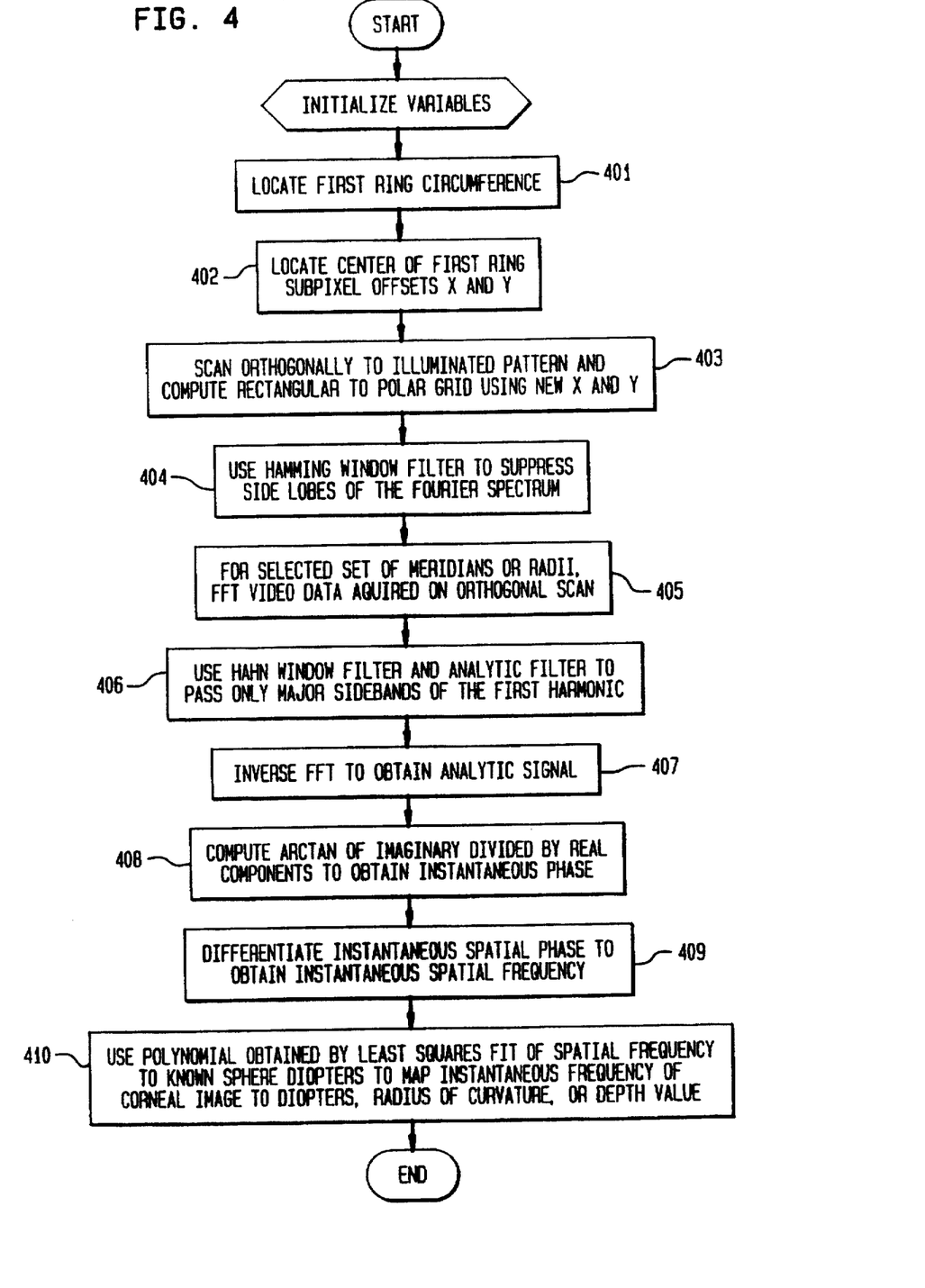
FIG. 4 is a flow chart for processing the scanned image to relate local spatial frequency at regularly-spaced pixel positions to diopters of refraction.

In the process described in my above-mentioned co-pending application, (the flow chart for which is shown in FIG. 4 and described in the Appendix hereto), the unwrapped phase was differentiated to obtain the instantaneous local spatial frequencies which were then mapped to diopters by a process of curve fitting. Briefly, the prior process was first calibrated by processing the images of a plurality of known specular surfaces having known dioptric powers of refraction to obtain the local spatial frequencies exhibited by the illuminated rings. The local spatial frequencies exhibited by the illuminated pattern reflected from each of the known surfaces was then mapped to their known dioptric powers by using a curve fitting technique such as least mean squares curve fitting, in which the coefficients of a polynomial to relate these frequencies to diopters was determined, e.g.:

$$D_1=g(f)=A_0+A_1 f+A_2 f^2+ \ldots +A_n f^n, \quad (6)$$

Thereafter, as shown in the flow chart FIG. 4, the local spatial frequencies obtained from processing the image of an unknown corneal surface could be employed with the determined polynomial to ascertain the corresponding diopters of that surface.

Figure 3C:
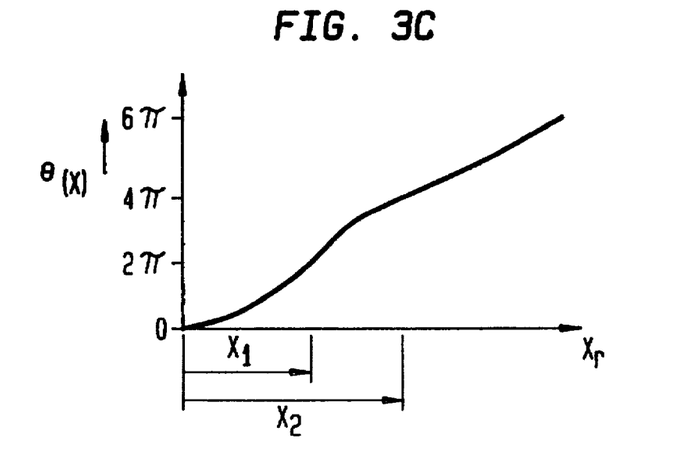
Figure 3D:
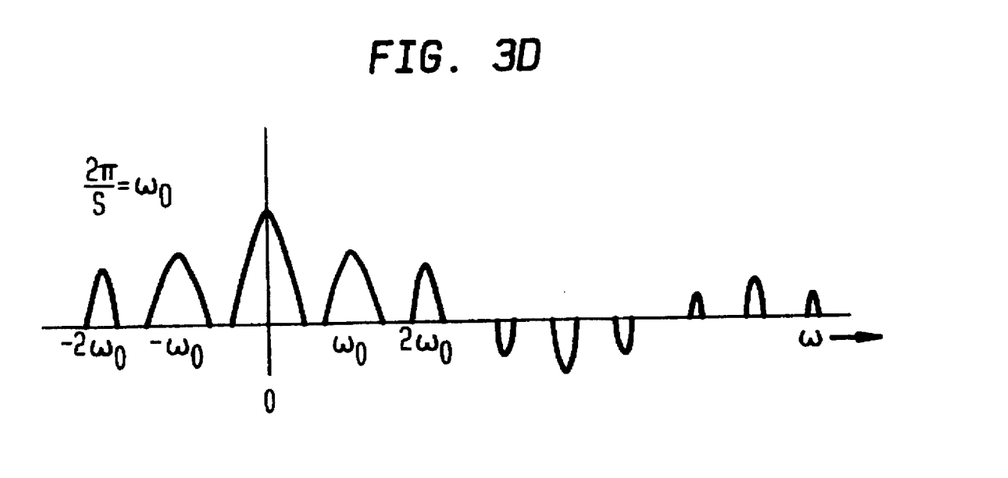
FIGS. 3D and 3E show the unfiltered and filtered Fourier spectra of a processed image.
Figure 3E:
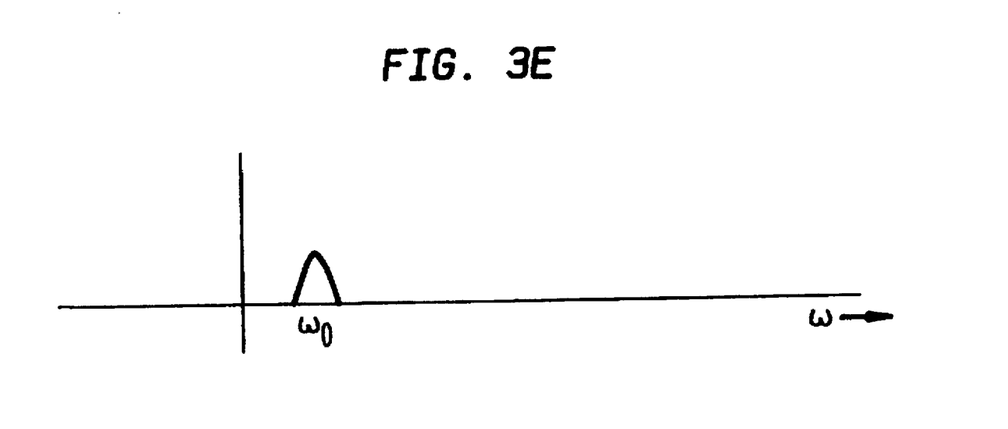

In accordance with my new method, advantage is taken of the fact that the local spatial phase exhibits values that are a multiple of $2\pi$ at the position of each successive one of the quasi-periodic illuminated rings in the processed image, as may be observed by comparing the unwrapped phase, FIG. 3C, with FIG. 3A. FIG. 3A shows the video intensity $I_{(x)}$ encountered in the x direction of scanning (i.e., orthogonally to the quasi-periodic pattern). As shown in FIG. 3C, the first and second $2\pi$ points in the processed image occur at the distances, $x_{r1}$ and $x_{r2}$ from the center of scanning, e.g., from the optical axis. The radial scanning distance at each $2\pi$ point is the radius of a ring in the image and twice this radius is the diameter h' of the ring. Referring again to FIG. 1, it is seen that diameter of the illustrative illuminated ring 13-1 on the bore 11 of Placido disc cone 10 is h. The ratio h/h' of the size of the original object to the size of its reflected image is the magnification M produced by the specular surface 6. As explained in the above-mentioned article by Janet Stone, the relationship between magnification M and diopters $\delta$ is $\delta=\frac{1}{2} dM$, where d is the distance along the optic axis between a point on the plane of the object and its image point. In the illustrative apparatus of FIG. 1, this distance is approximately constant for each ring.

Reference to FIG. 3C shows that the unwrapped local spatial phase gives a continuous series of values intermediate each set of $2\pi$ points. In the illustrative embodiment where cone 10 has a cylindrical bore 11, the dimension h is constant. Each $2\pi$ point such image ring is determined by the local magnification of surface 6 at the point. Intermediate the $2\pi$ points, the intermediate scanning distances corresponding to the "imaginary" intermediate rings in the image. However, since the corresponding "imaginary" intermediate ring in the cylindrical bore 11 of cone 10 has the constant dimension h, the magnification corresponding to each of these intermediate spatial phase points may be ascertained simply by dividing the corresponding intermediate scanning distance "$x_r$" by the constant dimension h, without need of any curve fitting.

Figures 5, 5B:
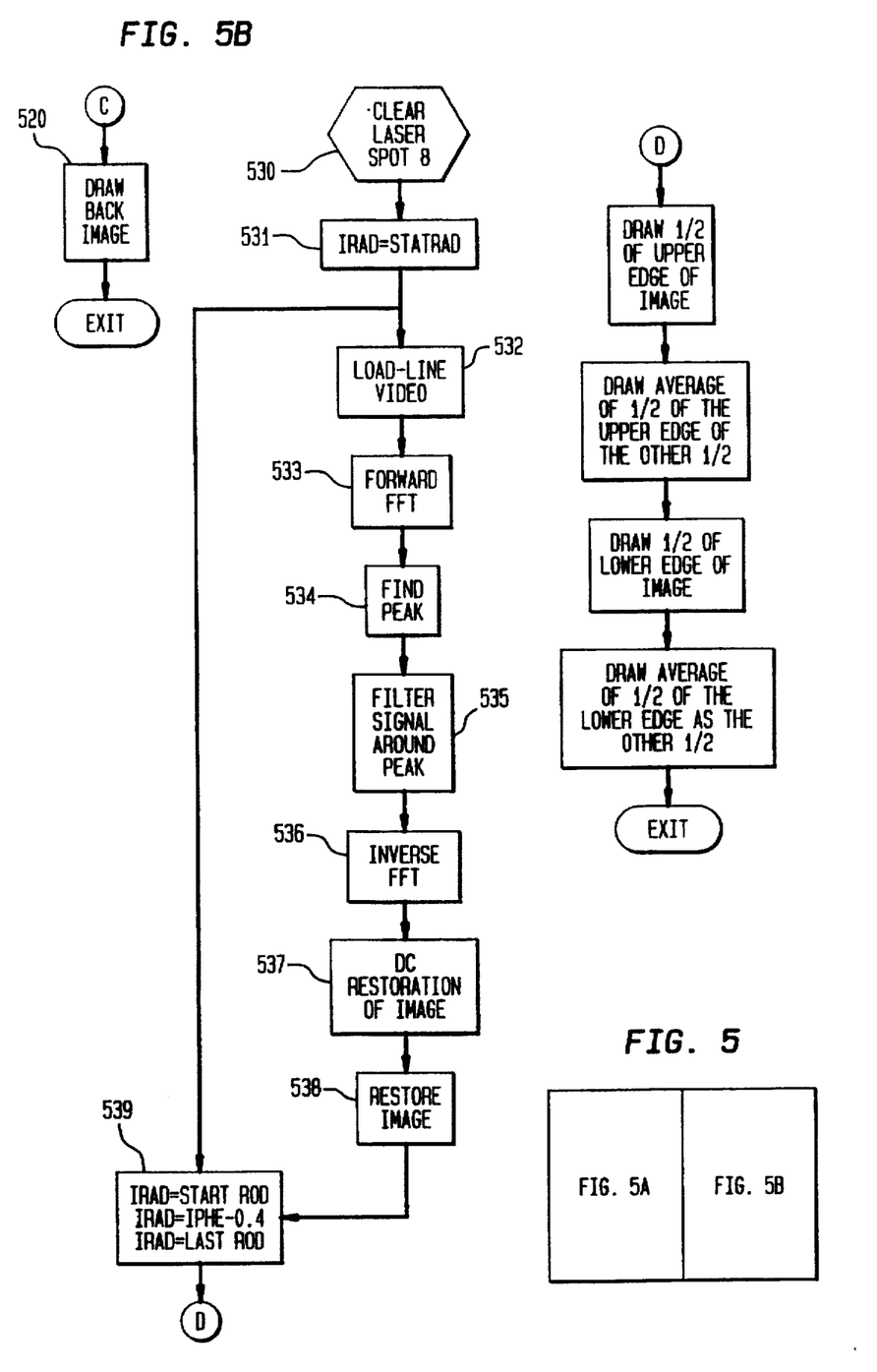
Figure 5A:
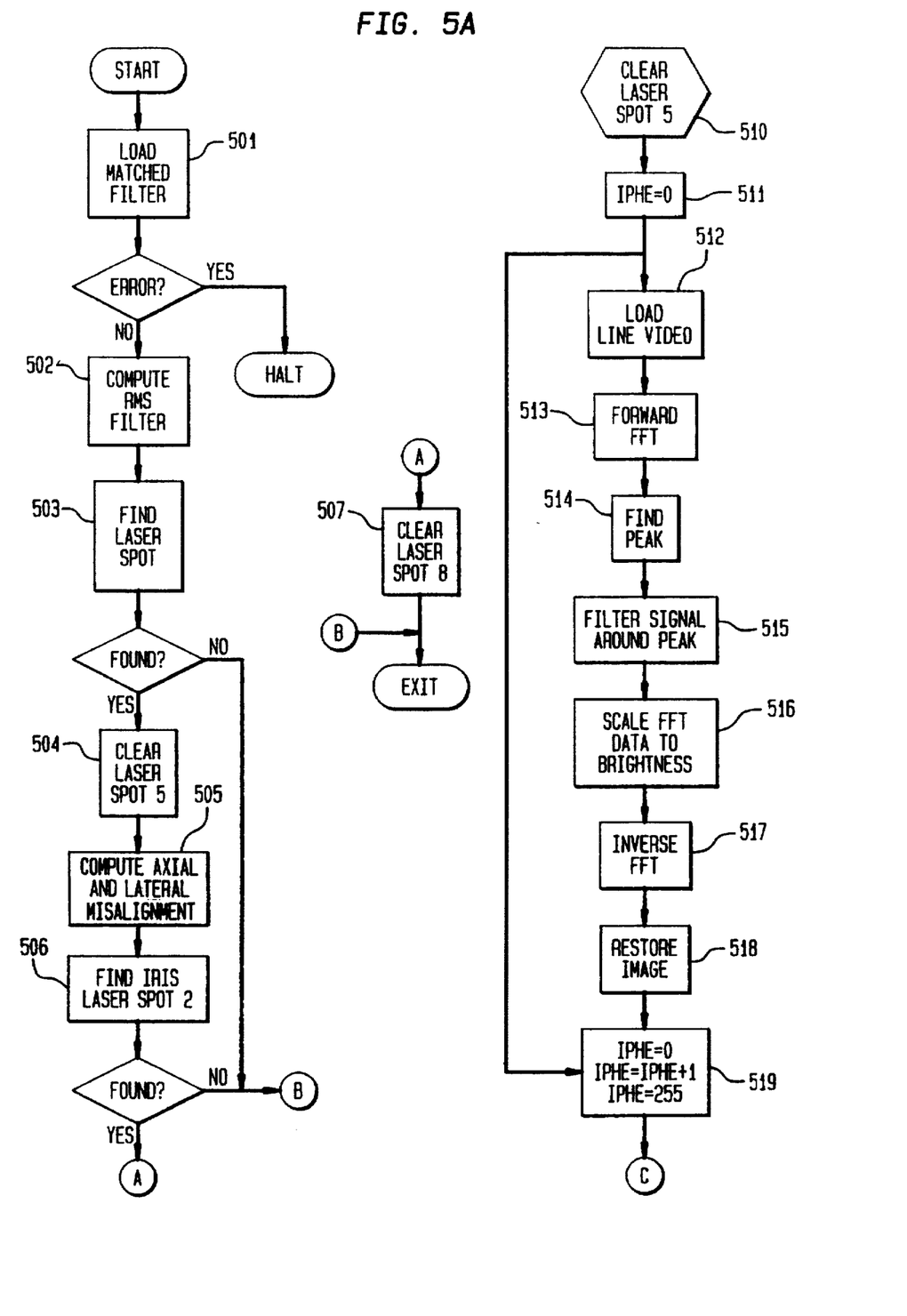

The actual processing steps of my new method are illustrated in the flow chart diagram, FIG. 5:

Step 501 entitled "load matched filter" loads an image of a paradigm laser spot $GS_f$ which is used as a matched filter. The paradigm laser spot is obtained by averaging the values obtained by the appearance of the laser spot on a plurality of different size and color eyes.

Step 502, labeled "compute RMS filter", computes the RMS value of the paradigm laser spot $GS_f$ by taking the square root of the sum of the squared values of the video intensity found over the area of $GS_f$.

Step 503, labelled "find laser spot" compares the video intensity $I_{(x)}$ of the illuminated surface on a pixel by pixel basis with the RMS value of spot GS that was obtained in step 502. A laser spot is identified when the video intensity $I_{(x)}$ of a scanned spot exceeds the RMS value of the spot GS, calculated as follows:

$$\frac{\sum_{i=-L}^{L} I_{(i+\text{offset})} * \text{filter}_i}{\sqrt{\sum_{i=-L}^{L} I^2_{(i+\text{offset})} * \sum_{i=-L}^{L} (\text{filter}_i)^2}} \quad (7)$$

In the above expression, L is the pixel-length of the filter data and OFFSET is the offset to the video data. The video data is convolved with the filter data for various values of OFFSET. When the expression reaches a maximum that exceeds a predetermined threshold, the location of the laser spot GS is detected. The point at which the laser spot is found is designated laser$_{gs}$. The distance D, expressed in millimeters, is obtained from the location laser$_{gs}$ as follows:

$$D = \frac{X_c - \text{Laser}_{gs}}{\text{pels/mm}} \quad (8)$$

where $X_c$ is the maximum number of pixels ("pels") in the scanned line.

Step 504, labelled "clear laser spot 5" calls the procedure detailed in steps 510 through 520 which clears the actual laser spot GS that is found in the scanned image.

Step 505, labelled "compute axial misalignment" computes the axial misalignment of point A, after laser spot GS has been cleared from the image being processed. As shown in FIG. 1, laser beam L1 travels through a tunnel in cone 10 which is at a fixed angle, illustratively, 38 degrees, to the optical axis, Z. Should surface 6 be inserted too far into the bore of cone 10, laser beam L1, instead of striking surface 6 at point A, will strike the surface at some distance above point A, such as at distance "D". Similarly, if surface 6 is not inserted far enough into the bore, laser beam L1 will strike the surface at some distance "D" below point A. The depth error, $\Delta Z$, measured along the optical axis, in the positioning of point A is calculated by the following:

$$\Delta Z = \frac{D}{\tan 38°} \pm e = \frac{D}{\tan 38°} \pm \left( R_{avg} - \sqrt{R_{avg}^2 - D^2} \right) \quad (9)$$

where $R_{avg}$ is the average radius of the specular surface, e.g., 7.85 mm for the average human cornea.

The above equation gives the depth error for the apex of surface 6 not being at point A, i.e., not at Z=0. The error in diopters caused by the depth error is compensated for by the following equation:

$$D_c = D_m + A + B * \Delta Z \quad (10)$$

where $\Delta Z$ is obtained from equation (10) above. The constants A and B are computed by processing a series of images of known diopter specular surface steel balls that have each deliberately been moved a known increment $\Delta Z$ away from point A and employing the least squares method to relate the measured diopters to the known diopters of each such surface.

In addition to correcting for axial misalignment, i.e., a displacement along the optical or Z-axis, Step 505 advantageously may also correct for any lateral misalignment, that is, a displacement of the apex of the cornea of the patient's eye from the assumed position, point "A" (FIG. 1), in the X or Y direction, i.e., transverse to the Z axis of the instrument Where the apex of the patient's cornea is properly positioned at point A, the origin for the radius of curvature, R, is at point 0,0,0 and the coordinates of point A are x,y,z. However, if it be assumed that the apex of the patient's cornea, instead of being properly positioned at point A, is displaced in the X direction by the amount $\Delta x$, the coordinates of the apex, now at point A', are $(x+\Delta x, y, z)$. The lateral misalignment will affect the measurement of the radius of curvature of the cornea so that the apparent, or estimated, radius of curvature, R', will be a vector extending from the origin 0,0,0 to the point $A'_{(x+\Delta x, y, z)}$ instead of to the point $A_{(x,y,z)}$.

The equations for the x, y, and z coordinates of point A in terms of the coordinates of point A' and of the actual radius of curvature of the patient's cornea R, versus the apparent radius of curvature, R', are given in (1) through (4) below, where $\theta$ is the angle of the projection of R on the XZ plane and $\phi$ is the angle of elevation of R.

$$x = (R'\sin\theta\cos\phi - \Delta x) \quad (1)$$

$$y = (R'\sin\theta\sin\phi)$$

$$z = R'\cos\theta$$

$$R = \sqrt{x^2 + y^2 + z^2}$$

$$R = \sqrt{(R'\sin\theta\cos\phi - \Delta x)^2 + (R'\sin\theta\sin\phi)^2 + (R'\cos\theta)^2} \quad (2)$$

$$= \sqrt{R'^2 - 2R'\sin\theta\cos\phi\Delta x + \Delta x^2} \quad (3)$$

$$= R'\sqrt{1 - \frac{2\sin\theta\cos\phi\Delta x}{R'} + \left(\frac{\Delta x}{R'}\right)^2} \quad (4)$$

Equation (4) can be simplified by resorting to a Taylor series expansion and neglecting all terms after the first two. Accordingly:

$$R = R'\left[ 1 + \frac{\sin\theta\cos\phi\Delta x}{R'} \right] \quad (5)$$

It will be recalled that the diopters of refraction, D, are equal to k/R, where k is the change in the index of refraction between air and the cornea. The counterpart of equation (4) for dioptric power is, accordingly:

$$D = \frac{k}{R'\sqrt{1 - \frac{2\sin\theta\cos\phi\Delta x}{R'} + \left(\frac{\Delta x}{R'}\right)^2}} \quad (6)$$

Equation (6) can similarly be simplified to yield:

$$D = D'\left[ 1 - \frac{\sin\theta\cos\phi\Delta x}{R'} \right] \quad (7)$$

where D'=k/R'.

An exemplary software listing, written in Pascal, for implementing equation (8), the correction for lateral misalignment in the X direction, is given below. The correction for misalignment in the Y direction is similar. The processing of the image acquired by camera 41, FIG. 1, depends on ring position. In the illustrative embodiment, which uses a cone device 10 of the type shown in U.S. Pat. No. 5,416,539, the first five, (innermost), rings, reflected upon the patient's cornea are produced by an illuminated disc (not shown in FIG. 1) that is placed at the righthand end of hollow bore 11. Because of the physically different manner in which the rings are produced in the cone device, a slightly different equation is employed for processing information from these rings (if iring <5) than for the other rings (else).

```
{correct for x errors}
if (valid_z) and (abs(dx) > 0) then
"if iring < 5 then
  PowerPtr^[iring][jphi] : = PowerPtr^[iring][jphi] *
  (( 1-0.025*sin((iring/ring_total_for_cone) * pi)* dx *
  (CosinesPtr^[jphi]))+ 0.015
  * sin((iring/ring_total_for_cone) * 2 * pi)* dx *
  (CosinesPtr^[jphi]))
"else
  PowerPtr^[iring][jphi] := (KMetricIndex / r_c) *
  ( 1-0.025*sin((iring/ring_total_for_cone) * pi)* dx *
  (CosinesPtr^[jphi]));
```

In the above listing, PowerPtr is an array containing the observed dioptric powers of the map from the Fourier processing of the two-dimensional image, indexed by current ring number, iring, and current angle, jphi (both integer numbers0. The angle of the sinusoidal function, sin((iring/ring_total_for_cone), is the fraction of the current ring number, iring, divided by the maximum number of rings, ring_total_for_cone. The quantity dx, is the displacement $\Delta x$ in the X direction of the point "A", as measured from the departure of the position of the fixation light 17', FIG. 1 from the center of the frame buffer of processor 42 storing the digitized information acquired by camera 41. In addition, the quantities "sin" and "cos" are expressed in a 360 degree system, while the quantities "sines" and "cosines" are expressed in a 256 degrees system since only 256 radial scans are employed in the exemplary embodiment. KMetric Index/r_c is the dioptric power at the radius r_c.

Step 506, labelled "find iris laser spot 2" examines the video intensity values in the region of point A (see FIG. 1) of the scanned image. When video intensity values exceeding the predetermined value expected for the image 17' of the fixation light 17 (see FIG. 1), Step 507, labelled "clear laser spot 8" is executed. This procedure is detailed in steps 530 through 539.

Clear Laser Spot 5 (Steps 510–519)

This procedure clears the laser spot GS from the image being processed.

Step 511 initializes the scanning angle φ for the acquisition of video data, $I_{(x)}$ along the scan line.

Step 512 loads the video data, $I_{(x)}$ obtained along the scan line.

Step 513 performs a fast Fourier transform (FFT) of the video data along the scan line.

Step 514 finds the peak value of the Fourier transform.

Step 515 filters the signal around the peak value.

Step 516 scales the FFT data to ensure that the image being placed on the screen is neither too light nor too dark.

Step 517 performs an inverse FFT.

Step 518 stores the results of processing the scan line data.

Step 519 increments the scan angle until the maximum value is reached. Steps 511 through 519 are then performed again until, illustratively, 256 radial scans are performed.

Clear Laser Spot 8 (Steps 530–539)

Step 531 initializes the scan radius to STATRAD the starting radius of the iris so that the laser spot can be found in this area. As described in U.S. Pat. No. 5,214,456 issued May 25, 1993, when radially scanning outwardly from the center of the cornea (a location in the area of the pupil) toward the limbus, video intensity is lowest in the area of the pupil and increases rapidly in the area toward the iris.

Steps 532 through 535, 536 and 538 These steps are similar to steps 512 through 515, 517 and 518, except that the data being operated upon is data pertaining to the iris portion of the eye.

Step 537 labelled "DC restoration of image" restores the DC of the video signal in the area of laser spot GS, which is much brighter than the DC levels elsewhere in the image, to the DC level existing in the adjacent sectors A-1 and B1, (see FIG. 2B).

Figure 6A:
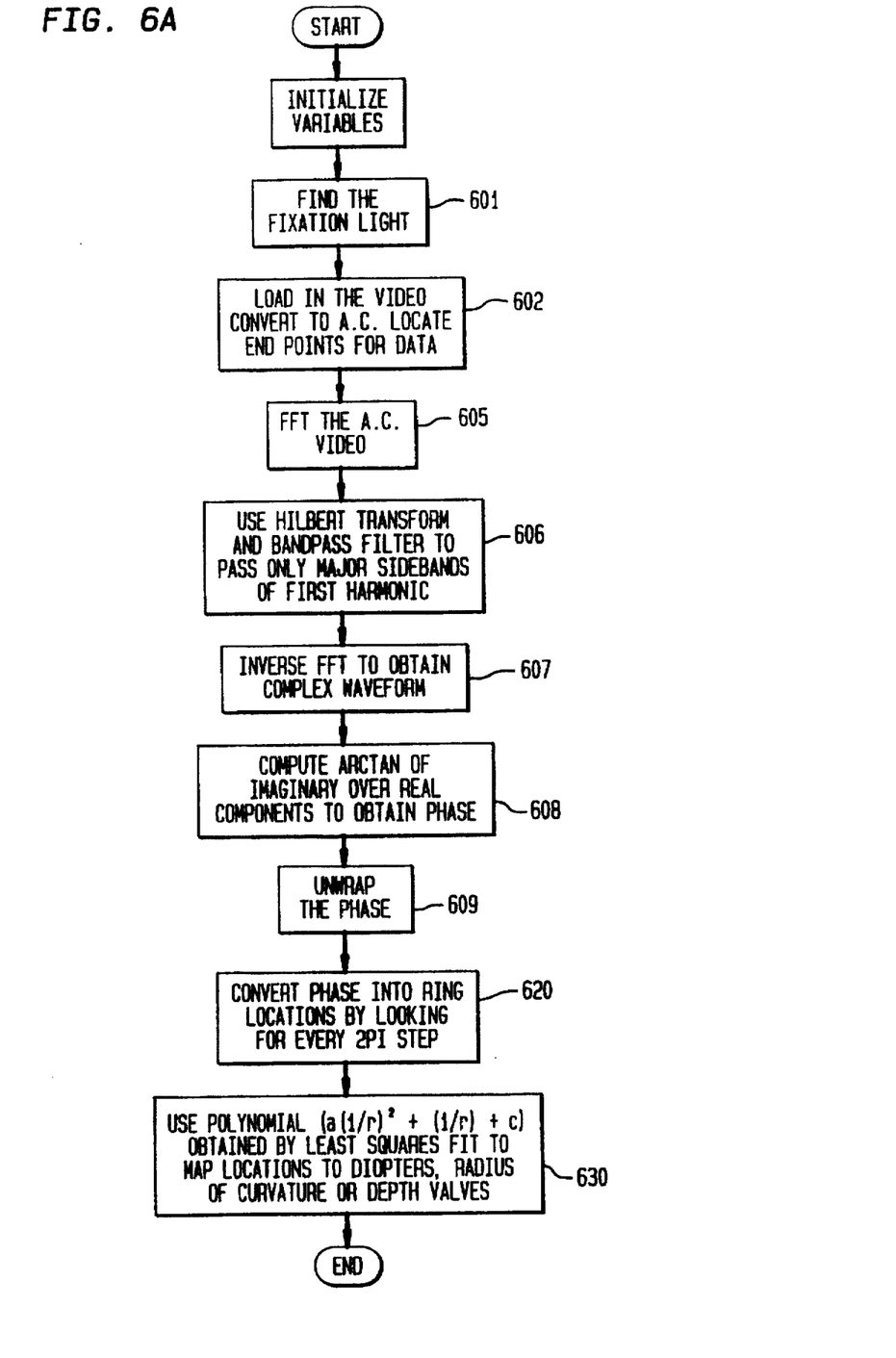
FIGS. 6A and 6B are flow charts for processing the scanned image to relate distances obtained from the unwrapped local spatial phase to diopters of refraction.
Figure 6B:
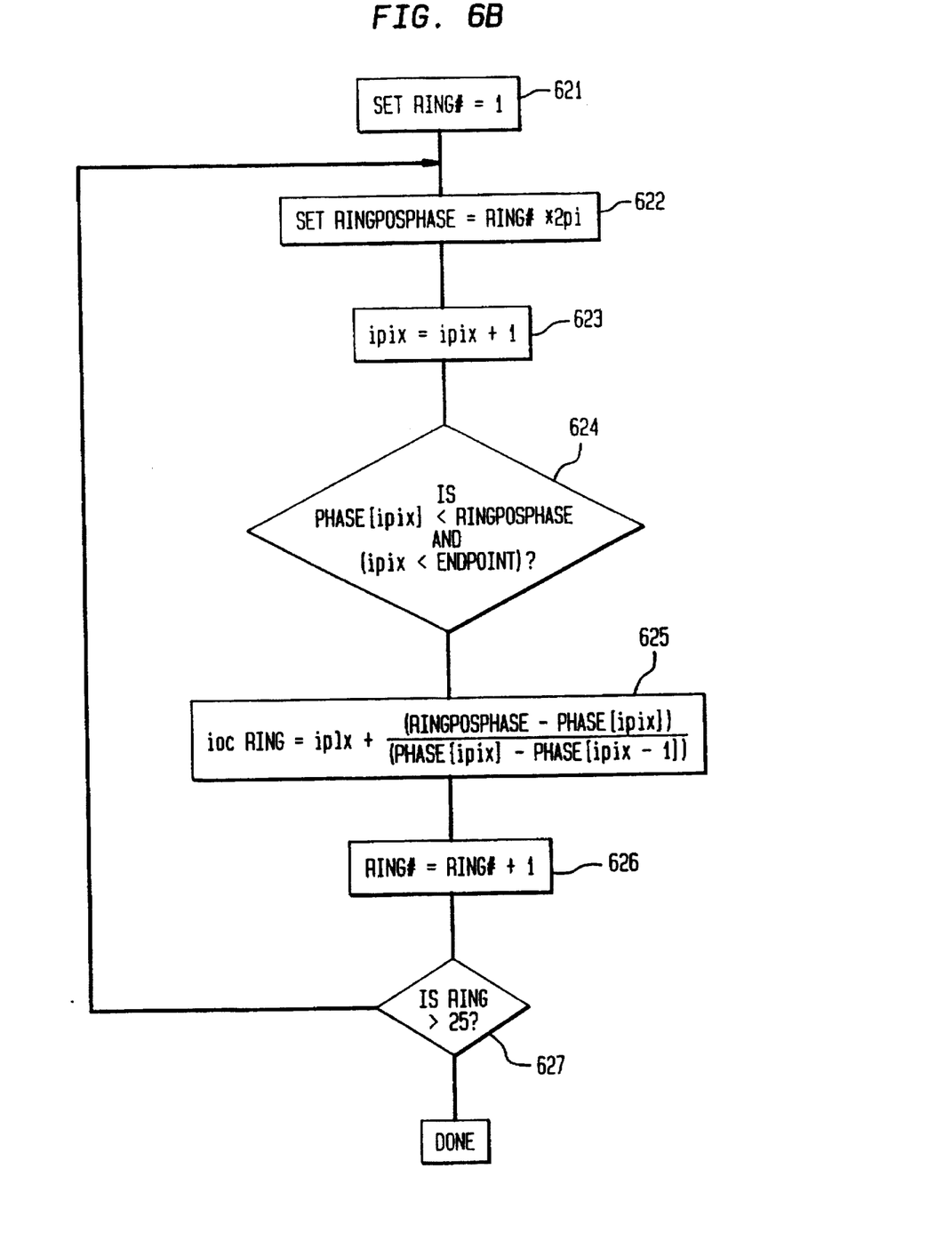

FIGS. 6A and 6B are flow charts for processing the two-dimensional image of a three-dimensional surface to ascertain the diopters of refraction present over the surface. In FIG. 6A steps 601 through 609 and 620 and 630 are illustrated. Of these steps, steps 601 through 609 are roughly comparable to steps 401 through 409 of FIG. 4. FIG. 6B shows the details of step 620 of FIG. 6A in which the distance perpendicular to the optical axis corresponding to each incremental value of local spatial phase is obtained so that diopters can be found as a function of incremental values of perpendicular distance rather than as a function of increments fixed by pixel position.

Steps 601 and 602 These steps acquire the two-dimensional video image of the three-dimensional surface whose topography is to be measured and are comparable to steps 401, 402 and 403 of flow chart FIG. 4.

Steps 605 and 606 These steps perform the Fourier transform on the acquired two-dimensional video data and employ a Hilbert transform and band-pass filter to suppress negative frequencies and all sidebands in the Fourier spectrum allowing only the major sideband of the first harmonic to pass to the next step. These steps are alternative, preferred processing steps to steps 404 through 406 of FIG. 4.

Step 607 performs the inverse Fourier transform to obtain the complex analytical signal having real and imaginary portions and is comparable to step 407 of FIG. 4.

Step 608 obtains the arc tangent of the quotient of the real and imaginary portions of the complex signal to obtain the wrapped spatial phase and is comparable to step 408 of FIG. 4.

Step 609 This step performs the step of phase-unwrapping and is comparable to step 409 of FIG. 4 which differentiates the discontinuous local spatial phase obtained in step 408 to obtain continuous values of local spatial frequency. However, unlike step 409, step 609 advantageously re-integrates the continuous values of local spatial frequency to obtain continuous values of local spatial phase.

Step 620 This procedure is detailed in FIG. 6B. Briefly, the continuous values of local spatial phase are inspected to ascertain the radial distance from the optical axis at which the local spatial phase exhibits values that are multiples of 2π. These local spatial phase values occur at the positions where the surface being measured reflects each of the rings in the illuminated pattern.

Step 630 This step samples the continuous values of local spatial phase and, during the calibration phase when the images of a plurality of known surfaces are processed, relates the local spatial phase values using a least-means-squares procedure to the known dioptric powers of the surfaces. A calibration matrix of dioptric power vs. spatial phase values is assembled. Thereafter, the calibration matrix is employed to ascertain the dioptric powers exhibited by an unknown surface from the processing of its image to yield continuous values of local spatial phase. In FIG. 6B:

Step 621 sets the count for ring# to 1 at the start of the procedure for finding the distances obtaining at values of local spatial that are multiples of 2π.

Step 622 sets the variable ringposphase to the count provided by step 621 multiplied by 2π.

Step 623 increments the count of the counter for the array "ipix" which is an array (signified by the use of square brackets) of local spatial phase values exhibited at the pixel positions of the processed image.

Step 624 determines whether the phase value exhibited in the current pixel position of the array is less than the variable ringposphase and whether the end of the array has been reached.

Step 625 determines for each increment of local spatial phase the corresponding distance in the image.

Step 626 increments the count for ring #.

Step 627 determines whether the maximum number of ring positions, illustratively 25, has been reached. If not, processing continues with a repetition of steps 622 through 627.

Appendix

FIG. 4 Basics of Image Processing Using Curve Fitting

FIG. 4 is a flow chart of the basic steps for analyzing a two-dimensional image of a three-dimensional surface and employing discrete Fourier transform processing to relate local spatial frequencies in the processed image to the three-dimensional radius or diopters of refraction of the surface. After the initialization of variables, steps 401 entitled "locate 1st ring circumference" and 402 entitled "locate center of 1st ring subpixel offsets x & y" locate the point from which the pattern in the image will be scanned in step 403. As described at column 8, line 9 et seq. of the aforementioned Gersten, et al. U.S. Pat. No. 4,863,269, the center point is determined from the first ring pattern appearing in the image. The details of this processing step are set forth in the steps of the main program below entitled "find_first_ring (ring1)" finds the edges of the first ring. This is the only ring pattern whose "edges" need to be determined.

In scanning images containing the focusing spot 17' provided by light source 17 and pellicle 16, FIG. 1, the focusing spot 17' may mask topographic data in the center of the scan. To avoid the discontinuity resulting from an absence of data that might impair the functioning of a Fourier transform, it may be advantageous to fill-in the missing data by using the data from two radial scans lying 180 degrees apart as being from one meridian and joining the data lying on opposite sides of the circle of omitted data. This is done in the procedure "sample_meridian" called for in the main program detailed below.

The video data of the acquired image is passed through a Hamming window filter in step 404 so that the side lobes of the Fourier spectrum obtained in the FFT step 405 will be suppressed. After the FFT is obtained the Fourier spectra is subjected to a Hahn filter in step 406 so that only major side bands of the first harmonic are passed. The inverse Fourier transform is obtained in step 407, the arctangent of the quotient of the imaginary divided by the real components of the inverse transform yields the local spatial phase in step 408. The local spatial phase is differentiated in step 409 to obtain the local spatial frequency and, in step 410, a polynomial is found using the least squares curve fitting technique to map the local spatial frequencies to diopters from the processed images of a number of known surfaces. When the center of the image is restored (see "procedure restore_center"), the dioptric powers obtained from the processing are plotted in their correct positions.

The plotting programs used in the above-mentioned Gersten et al. patent device plotted the dioptric powers of the surface along the perimeter of the rings observed in the image. To use these prior plotting programs a "ring structure" is necessary. The step entitled "compute_spatial_freq_pseudo_rings" creates pseudo rings from which the instantaneous dioptric information can be read and delivered to the plotting programs. A "ring" for such plotting is identified by taking the mean value of eight instantaneous frequencies read along a meridian.

| Programs |
|---|
| program compute_corneal_power; |
| uses |
|     crt,deplib,filtlib,ring1lib,plotlib,vgalib,pointlib, |
|     cmplxlib,cmplxvs,fftlib,v8lib,util,global; |
| const |
|     debug = true; |
| var |
|     ixl,iyl: integer; |
|     max_diop,min_diop: single; |
|     exam: words; |
| begin |
|     if paramcount = 1 then exam := paramstr(1) else exit; |
|     new(meridian); |
|     new(dio); |
|     fillchar(dio^,sizeof(dio^) ,0); |
|     set_rick_defaults(ixl,iyl,ham_window,han_window); |
|     x_ctr := ixl; |
|     y_ctr := iyl; |
|     display_selected_frame(exam,error); |
|     find the fixation_light(x_ctr,y_ctr,vga_xc,vga_yc); |
|     find_first_ring (ring1); |
|     find_offsets(ring1,xmean,ymean); |
|     for itheta := 0 to 127 do |
|         begin |

| Programs (continued) |
|---|
|     sample_meridian (debug, ring1, itheta, -xmean, |
|         -ymean, ham_window, meridian, last_points); |
|     rfftc(meridian^,m); |
|     fft_filter(debug,meridian,han_window); |
|     fftc(meridian^,m,invs); |
|     compute_phase(debug, itheta,meridian, ring1,phase); |
|     restore_center (itheta, ring1,meridian); |
|     compute_spatial_freq_pseudo_rings (debug, itheta, |
|         phase, dio); |
|     compute_powers (itheta,min_diop,max_diop,dio); |
|     write(itheta:4); |
|     end; |
|     lowpass_meridians(last_points,dio); |
|     lowpass_circumference(dio); |
|     lowpass_circumference(dio); |
|     preen_output(dio); |
|     write_output_to_disk(min_diop,max_diop,dio); |
|     dispose(meridian); |
|     dispose(dio); |
| end. |
| procedure sample_meridian(debug: boolean; ring1: r256; itheta: |
|     integer; xmean,ymean: single; hw: r512a; var mer: r512c; var |
|     last_points: i256); |
| var |
|     iphe,ipix,ir,offr0,offr1, lp0, lp1: integer; |
|     f,theta: single; |
|     vid: i512; |
|     curv: ^r512a; |
| begin |
|     fillchar(mer^,sizeof(mer^),0); |
|     fillchar(vid,sizeof(vid),0); |
|     for ir := 1 to last do |
|     read_polar_pixel(ir,itheta,2.0*xmean,2.0*ymean,vid[ir]); |
|     for ir := 0 to last-1 do |
|     read_polar_pixel(ir,itheta+128,xmean,ymean,vid[-ir]); |
|     if itheta = 0 then |
|     for iphe := 0 to lim do |
|     load_last_points(iphe,vid,last_points); |
|     lp0 := last_points[itheta]; |
|     lp1 := last_points[itheta+128]; |
|     for ir := 0 to lp0 do |
|         begin |
|         offr0 := round(ring1[itheta]); |
|         offr1 := round(ring1[itheta+128]); |
|         mer^[ir].r := vid[ir+offr0] * |
|         hw[ir+(last_rad-lp0)]; |
|         mer [-ir+1].r := vid[-ir-offr1] * |
|         hw[-ir-(last_rad-lp1)]; |
|         end; |
|     if debug then |
|         begin |
|         new(curv); |
|         for ir := -last+1 to last do |
|         curv^[ir] := mer^[ir].r; |
|         plot_r512a(curv^,13,6,true); |
|         dispose(curv); |
|         end; |
| end; |
| procedure restore_center(itheta: integer; ring1: r256; var |
|     meridian: r512c); |
| var |
|     ir: integer; |
| begin |
|     for ir := last downto round(ring1[itheta]) do |
|         begin |
|         meridian^[ir] := meridian^[ir-round (ring1 |
|         [itheta])]; |
|         meridian^[-ir+1] := meridian^[-ir+round (ring1 |
|         [itheta])+1]; |
|         end; |
|     for ir := -round(ring1[itheta]+1) to round(ring1[itheta]) do |
|         begin |
|         meridian^[ir].r := 0.0; |
|         meridian^[ir].i := 0.0; |
|         end; |
| end; |

Accordingly, I have described an illustrative embodiment of my invention. Numerous modifications may be employed by those skilled in the art such as substituting a converging for the diverging lens in which case "minification" substitutes for the magnification which has been described. In addition, other types of windows may be substituted for the Hamming and "hanning" windows set forth in the described embodiment. Alternative transforms, such as the Hilbert transform or finite impulse response filters may also be employed to derive the instantaneous spatial frequencies and other forms of polynomial curve fitting may be employed besides the linear least-squares technique described. Further and other modifications may be apparent to those skilled in the art without, however, departing from the spirit and scope of my invention.

What is claimed is:

1. The process of operating a stored program controlled apparatus to display a two-dimensional map of measurements of the local surface magnification of a three-dimensional surface reflecting a quasi-periodic mire pattern from an illuminated object, comprising the steps of:
   a. processing two-dimensional scanned images of a plurality of known diameter, three-dimensional spheres reflecting said pattern from said object to ascertain the two-dimensional distances (h') on said surface at which predetermined local spatial phases occur in said scanned images;
   b. computing, for each of said images, the ratio of said two-dimensional distances (h') to the size (h) of a corresponding portion of said object to ascertain the local magnification of said surface;
   c. processing a two-dimensional image of an unknown surface to ascertain the two-dimensional distances thereon at which said predetermined local spatial phases occur in said scanned image; and
   d. displaying an indication of the local magnification of said unknown surface corresponding to said last-mentioned two-dimensional distances.

2. The process of claim 1 wherein said displaying includes multiplying said two-dimensional distances ascertained from processing said image of said unknown surface by said ratio computed from said images of said known diameter three-dimensional spheres.

3. The process of claim 1 wherein said pattern includes a series of concentric mires and wherein said displaying includes interpolating said magnification between adjacent ones of said mires.

4. The process of claim 3 wherein said displaying includes displaying said magnification between adjacent ones of said mires by variation in the color of said display.

5. The process of operating a stored program controlled apparatus to display a two-dimensional map of measurements of the third dimension of a three-dimensional surface reflecting a quasi-periodic mire pattern from an illuminated object, comprising the steps of:
   a. processing two-dimensional scanned images of a plurality of known diameter, three-dimensional spheres to ascertain the two-dimensional distances (h') on said surface of said spheres at which predetermined local spatial phases occur in said scanned images;
   b. computing the ratio of each of said two-dimensional distances (h') to the size (h) of a corresponding portion of said object to ascertain the local magnification of said surface;
   c. processing a two-dimensional image of an unknown surface to ascertain the local spatial phases therein and the corresponding two-dimensional distances on said surface;
   d. multiplying said two-dimensional distances ascertained from processing said image of said unknown surface by a corresponding ratio computed from said images of said three-dimensional spheres to obtain the local magnification of said unknown surface; and
   e. displaying on said image of said unknown surface a continuous indication of the local magnification of said unknown surface.

6. The process of claim 5 wherein said displaying includes displaying an indication of the diopters of refraction of said surface.

7. The process of claim 5 wherein the local spatial phase is unwrapped to obtain continuous values of local spatial phase with distance from the optical axis of the image.

8. The process of employing a stored program controlled apparatus for displaying a map of the dioptric powers of refraction exhibited over a three-dimensional surface, comprising the steps of:
   a. processing a two-dimensional image of a three-dimensional surface illuminated with a quasi-periodic mire pattern to ascertain the instantaneous local spatial phases contained therein;
   b. ascertaining from said image the orthogonal distances on said surface at which predetermined ones of said local spatial phases occur;
   c. correlating said orthogonal distances with the diopters of refraction of a plurality of known three-dimensional surfaces, and
   d. displaying a continuous two-dimensional map of the dioptric powers of said three-dimensional surface obtained from said correlating.

9. The process of claim 8 wherein said orthogonal distances are orthogonal to an optical axis of said surface.

10. The process of claim 8 wherein said correlating includes forming a tabulation of said diopters and said orthogonal distances.

11. The process of claim 10 wherein said correlating includes employing said tabulation to ascertain the coefficients of a polynomial relating said orthogonal distances to said diopters of refraction.

12. The process of claim 11 further comprising the step of:
   e. ascertaining said orthogonal distances in an image of an unknown three-dimensional surface; and
   f. employing said polynomial to determine the diopters of refraction of said unknown surface.

13. The process of claim 10 further comprising the step of:
   e. ascertaining said orthogonal distances in an image of an unknown three-dimensional surface; and
   f. employing said tabulation to determine the diopters of refraction of said unknown surface.

14. The process of displaying a map of a three-dimensional surface's third dimensions comprising the steps of:
   processing two-dimensional scanned images of three-dimensional surfaces reflecting images of objects to ascertain the continuous variation in local spatial phase with distance from an optical axis in said two-dimensional images;
   obtaining a two-dimensional distance (h') on said surface from each of said images corresponding to each said local spatial phase;
   compiling a tabulation relating each said two-dimensional distance to a known dimension (h) of each of said objects; and
   employing said tabulation to relate a two-dimensional distance obtained from said processing of a two-dimensional image of an unknown three-dimensional surface to the third dimension thereof.

15. The process of displaying a map of the dioptric powers of refraction exhibited over an unknown, three-dimensional, quasi-spherical, specular surface, comprising the steps of:
   a. processing a plurality of orthogonally scanned two-dimensional images of known specular spheres exhibiting a mire pattern to obtain the coefficients of a polynomial relating (I) the known dioptric powers of said plurality of spheres to (ii) the instantaneous spatial frequencies exhibited by said mire pattern in said images,
   b. processing an orthogonally scanned two-dimensional image of an unknown three-dimensional quasi-spherical specular surface illuminated with said mire pattern to ascertain the instantaneous spatial frequencies contained in said image,
   c. substituting said instantaneous spatial frequencies obtained from processing said image of said unknown surface in said polynomial to obtain the dioptric powers of said unknown surface, and
   d. displaying a two-dimensional map of the dioptric powers of said unknown surface on said image.

16. The process of claim 15 wherein said three-dimensional surface is illuminated with a positioning light spot and wherein said processing includes ascertaining the location of said positioning light spot in said two-dimensional image.

17. The process of claim 16 wherein said processing includes ascertaining from said location of said light spot a differential axial position of said unknown three-dimensional surface.

18. The process of claim 17 wherein said processing includes correcting the value of said dioptric powers of said unknown surface in accordance with said differential axial position.

19. The process of claim 18 wherein said correcting includes processing a series of images of known specular surfaces each displaced by a predetermined axial amount.

20. The process of claim 16 wherein said processing includes ascertaining the departure of said location of said light spot from the center of said two-dimensional image.

21. The process of claim 20 wherein said processing includes correcting the value of said dioptric powers of said unknown surface in accordance with said ascertained departure of said light spot from the center of said two-dimensional image.

22. The process of operating a stored program controlled apparatus to display a two-dimensional map of measurements of the third dimension of a three-dimensional surface reflecting a quasi-periodic mire pattern from an illuminated object, comprising the steps of:
   a. storing the two-dimensional distances in each of a plurality of images of three-dimensional surfaces illuminated with said pattern at which predetermined local spatial phases occur;
   b. computing, for each of said images, the ratio of said two-dimensional distances to the size of a corresponding portion of said object to ascertain the local magnification of said surface;
   c. processing a two-dimensional image of an unknown surface to ascertain the two-dimensional distances therein at which said predetermined local spatial phases occur; and
   d. displaying on said image of said unknown surface an indication of said magnification.

23. The process of correcting the apparent three-dimensional radius of curvature R' of a corneal surface displayed on a two dimensional map acquired by processing a two-dimensional image of said surface, said processing proceeding from a predetermined point corresponding to the origin of a mire pattern reflected upon said surface when said surface is displaced from said predetermined point, comprising the steps of:
   a. reflecting a spot of light on said surface to define the apex thereof;
   b. defining said predetermined point in a stored two-dimensional image of said surface;
   c. ascertaining the transverse displacement $\Delta x$ of said light spot from said predetermined point in said stored image; and
   d. calculating the correct radius of curvature R, according to $$R = R'\left(1 + \frac{\sin\theta\cos\phi\Delta x}{R'}\right)$$

where $\theta$ is the angle which the projection of the apparent three-dimensional radius of curvature R' makes with the x-axis in the X,Z plane and $\phi$ is the angle of elevation of R' with respect to the X,Y plane.

24. The process of correcting the apparent dioptric powers of a corneal surface displayed on a two dimensional map acquired by processing a two-dimensional image of said surface, said processing proceeding from a predetermined point corresponding to the origin of a mire pattern reflected upon said surface when said surface is displaced from said predetermined point, comprising the steps of:
   a. reflecting a spot of light on said surface to define the apex thereof;
   b. defining said predetermined point in a stored two-dimensional image of said surface;
   c. ascertaining the transverse displacement $\Delta x$ of said light spot from said predetermined point in said stored image; and
   d. calculating the correct dioptric power D, according to $$D = D'\left(1 - \frac{\sin\theta\cos\phi\Delta x}{R'}\right)$$

where $\theta$ is the angle which the projection of the apparent three-dimensional radius of curvature R' makes with the x-axis in the X,Z plane, $\phi$ is the angle of elevation of R' with respect to the X,Y plane, D'=k/R' and k is the change in the index of refraction between air and the cornea.

* * * * *